Figure 1:
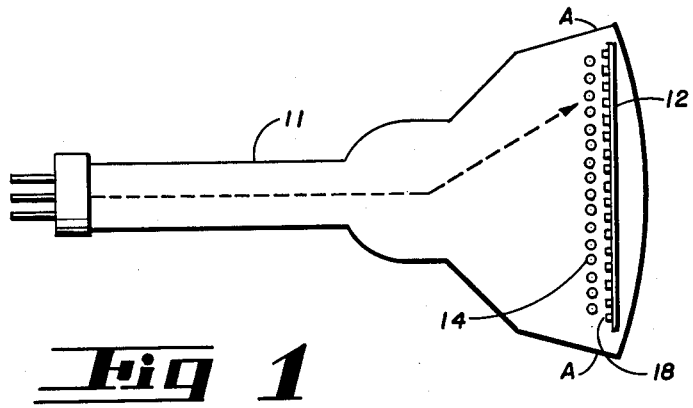

Feb. 7, 1956  W. H. MYERS  2,734,013
DECALCOMANIA PROCESS FOR MAKING CATHODE-RAY TUBE SCREEN
Filed March 11, 1954

INVENTOR.
WILLIAM H. MYERS.
BY Alden D. Redfield
Norman J. O'Malley.
ATTORNEYS.

United States Patent Office 2,734,013
Patented Feb. 7, 1956

2,734,013

DECALCOMANIA PROCESS FOR MAKING CATHODE-RAY TUBE SCREEN

William H. Myers, Cincinnati, Ohio, assignor to Avco Manufacturing Corporation, Cincinnati, Ohio, a corporation of Delaware Application March 11, 1954, Serial No. 415,645

5 Claims. (Cl. 154—95)

This invention relates generally to a process for applying phosphors to the screen surface of a cathode-ray tube, and more specifically, to an economical process suitable for rapid application of either uniform black and white phosphor mixtures or color phosphors in a fixed given design to the screen surface of a color type cathode-ray tube.

Many processes have been developed for applying a uniform deposit of phosphor mixtures on cathode-ray tube screens suitable for reproducing images in black and white. Generally, these processes include a phosphor application step wherein the phosphors are either uniformly sprayed, dusted or settled through a liquid cushion in proper depth on the screen surface. At present, the settling process is by far the most popular.

With the advent of color television, it has become necessary to apply several types of phosphors to selected areas of the cathode-ray tube screen, each having a different color fluorescing characteristic. One type of tube contemplated for early production uses a screen made up of phosphor color dots having a fixed color distribution. In this type of screen, each image point includes a red fluorescing phosphor dot, a blue fluorescing phosphor dot and a green florescing phosphor dot in spaced triangular configuration. In a second type of color tube, the various colored phosphors are placed on the screen in lines or strips having a fixed color order defined by the type of sweep cycle adopted.

In general, it can be said of all color type cathode-ray tubes that accurate color phosphor placement is required and, as a result, one school of thought advocates direct application of phosphors to the screen by use of the silk screen printing process. This process has been relatively successful, though expensive, when used to apply phosphors to a flat screen surface. Lately a second method has been developed for direct application of color phosphors to a concave surface which involves a settling process combining many of the phosphor settling techniques developed for black and white cathode-ray tubes along with a photographic process for fusing only given portions of the settled phosphors to the screen surface. This last-mentioned process requires a separate settling step for each color phosphor used and, as a result, at least three times the settling time needed for a black and white phosphor screen is required for settling the tri-color phosphor screen.

Both of these processes, i. e., the silk screen process and the triple-settling process, are relatively expensive when compared to the cost of producing an ordinary black and white phosphor screen. Thus, it would be desirable to provide a process for placing color phosphors on a cathode-ray tube screen which eliminates many of the disadvantages without sacrificing the accuracy of either the direct-applied silk screen process or the triple-settling process.

It would also be desirable to provide a process for placing black and white phosphor mixtures on a cathode-ray tube screen which eliminates the major portion of the time period now required by the conventional phosphor settling process. Therefore, it is a general object of this invention to provide a production process for placing either black and white phosphor mixtures or color phosphors on a cathode-ray tube screen.

It is also an object of this invention to provide an accurate process for placing phosphors on a cathode-ray tube screen involving a minimum expenditure of labor, material and time.

It is a further object of this invention to utilize the maximum accuracy available in multi-color printing processes to provide an accurate and cheap color phosphor sheet for application to a cathode-ray tube screen.

In addition, it is an object of this invention to apply color phosphors to the cathode-ray tube screen, using a simple decalcomania process which not only provides an accurate color phosphor arrangement, but also provides a base upon which an electron-permeable metallic reflecting surface may be vaporized.

Briefly, the invention comprises a process wherein strips, dots or areas of either black and white phosphor mixtures or color phosphors are printed on an organic type base having a paper, plastic or other suitable backing with a low temperature coefficient of expansion. The resulting decalcomania is then used to apply the phosphors to the cathode-ray tube screen after which the backing surface is removed. If desired, an aluminum coating may be applied on the base film before the backing is secured, during fabrication of the decalcomania, or after the backing is removed as a step in the screen fabricating process.

Figures 2, 4:
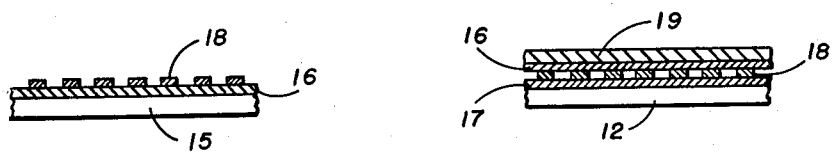
Figure 3:
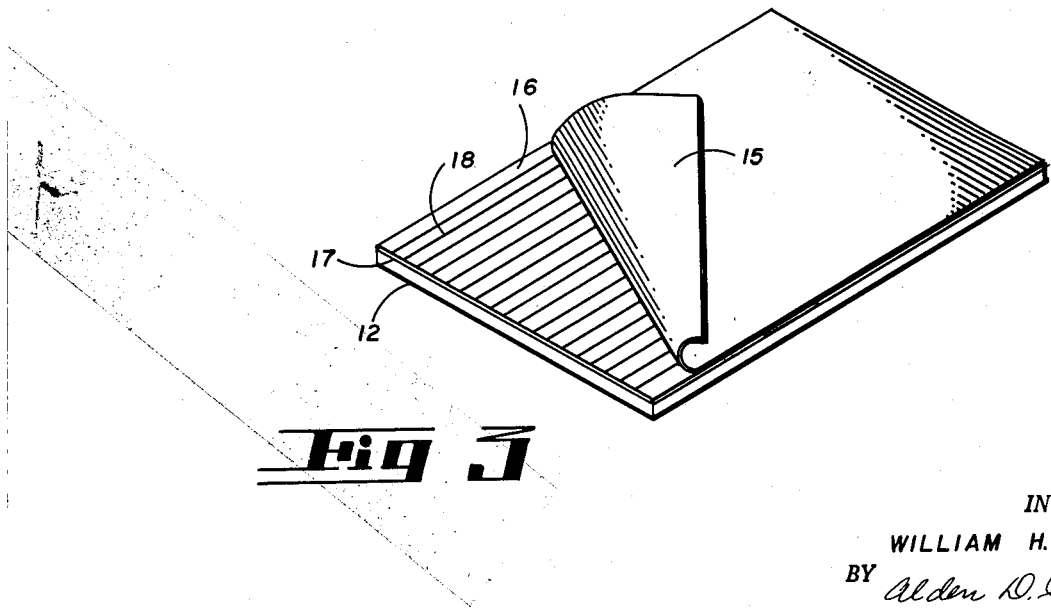

For a better understanding of the present invention, together with other and further objects, advantages and capabilities thereof, reference is made to the following disclosure and appended claims, in connection with the accompanying drawings, in which:

Fig. 1 is a diagrammatic representation of a line-grid type color cathode-ray tube; and Fig. 2 is a diagrammatic cross section of a decalcomania transfer; and Fig. 3 diagrammatically shows application of the decalcomania transfer; and Fig. 4 is a diagrammatic cross section of the screen prior to the final operation.

It is to be noted that the number of phosphor lines in Figs. 1 through 4 and the number of grid wires shown in Fig. 1 have been purposely limited in order to avoid drafting problems. In actual practice the phosphor deposits are very minute, and the number of lines and grid wires are governed by the number of lines of information received in each frame and thus are far in excess of those shown for purposes of explanation.

In Fig. 1 there are shown schematically the basic elements of a line-grid type tricolor cathode-ray tube. The envelope 11 is generally fabricated in two parts separated along line A—A. The electrons which are produced by a conventional electron-producing means in the neck portion of the tube are deflected, as represented by the dashed arrow, to sweep over the surface of the screen 12. Grid 14, which is placed in close proximity to the phosphor screen coating 18, generally carries deflecting and focusing potentials which so act on the electron beam as to insure correct registration.

Since this invention pertains solely to a process for fabricating a suitable screen element which may be used either in a black and white tube, a line-grid type of color tube, or in other color tubes requiring accurate placement of phosphors on a screen, it is believed unnecessary to expand the discussion here so as to include a description of all tube types in which the resulting screen may be used.

First considering color type cathode-ray tubes in general and the line phosphor type in particular, in Fig. 2 there is shown, in enlarged partial, cross section form, a view of the decalcomania used to apply color phosphor lines to the screen surface. The backing or base 15 of the decalcomania may be formed of paper, plastic or any other suitable substance having a low temperature coefficient of expansion and which will retain its size and shape without substantially stretching or contracting while being handled. This backing 15 is covered, over the desired screen area, with a film 16 which may be formed of appropriate resins, plastics or other film material known to be useful in supplying a smooth coating over the screen phosphors upon which a metallic electron-permeable light-reflecting film may be vaporized. Film 16 should be bonded to backing 15, but not to the extent that separation is difficult. Preferably, backing 15 and film 16 are bonded by an electrostatic force or a combination of electrostatic force over the main area and a soluble adhesive bonding on the edges. Basically, these two layers may be held together by any means which will allow separation without distortion or modification of the shape of film 16 during or after the transfer process. Other methods will occur to those skilled in the art, and this invention is not to be considered limited to the specific binding means described.

Phosphor strips 18 may be placed in fixed position on film 16 by highly accurate, standard printing techniques. The completed decalcomania is then ready for application to the color screen in final assembly of the cathode-ray tube.

In Fig. 1, phosphor screen 12 is shown as a flat, transparent sheet formed from plate glass or other suitable material positioned inside of the cathode-ray tube envelope 11. Also, it may be desirable to use the inside end surface of the cathode-ray tube envelope, as is now done with black and white tubes and color tubes produced by use of the phosphor triple-settling technique previously outlined.

For purposes of explanation, however, the remaining description will primarily concern techniques involved in applying phosphors to a flat, transparent plate. It will become apparent to those skilled in the art that these techniques are applicable, regardless of the screen surface selected.

In Fig. 3 I have shown a screen plate upon which the decalcomania described in connection with Fig. 2 has been placed. Prior to placing the decalcomania on plate 12, the receiving plate surface may be coated with an appropriate silicate, e. g., sodium or potassium silicate or other bonding agent for bonding the phosphors to the plate surface. The decalcomania may be placed in position while the silicate coating is still slightly tacky, in order to hold the phosphor strips in place after the backing 15 is removed. If some other force, such as an electrostatic force, is used to hold the phosphors in place temporarily on screen surface 12, then any necessary silicate coating may be allowed to dry before the decalcomania is placed in position. After the decalcomania is positioned on the plate, the paper backing is removed by either dissolving the binding adhesive wherever present or discharging the electrostatic charge which binds film 16 to the backing sheet 15.

In Fig. 4 I have shown a cross sectional view of the finished screen. Referring to this figure, it will be seen that the silicate film 17 separates phosphor strips 18 from the surface of transparent plate 12; it will also be seen that film 16 rests upon phosphor strips 18.

In the majority of color tubes it is necessary to apply an electron-permeable light-reflecting film between the source of electrons and the phosphors. As the art developed, it was first considered proper to apply this film directly over the phosphors by vaporization or some similar process. It was then discovered that the reflecting characteristic of a directly applied metallic film was seriously impaired, due to the surface imperfections and irregularities inherent in the phosphor deposit. Subsequently, many schemes and processes were developed for applying a smooth film to cover the phosphor deposit so that the phosphor side of the metallic film was smooth and free from major imperfections. In most processes this intervening film comprises a volatile substance which is removed in an intermediate baking-out process.

In my process film 16 may be used to provide this smooth surface upon which the metallic electron-permeable film 19 is deposited either during fabrication of the decalcomania or after the transfer portion has been applied to screen plate 12. After the phosphors, the intervening film and the metallic light-reflecting layer have been deposited on the screen, the complete unit is baked out at an adequate temperature to remove the organic elements in film 16 and the gases from the remainder of the screen components and to fuse the phosphors to the surface of plate 12. The completed screen is then ready for insertion in the cathode-ray tube envelope 11.

The invention is not considered to be limited to use in color type tubes. It is applicable, not only to color tubes of the phosphor dot and line screen type but also to black and white cathode-ray tubes. For example, as has been stated, black and white phosphor mixtures are conventionally applied to the inside surface of the forward portion of the tube envelope by a settling process. Though this settling process has been improved through the years, considerable time and handling are still required to produce each screen. By using a decalcomania transfer it is possible to print the black and white phosphor mixtures at an even depth on a transfer film similar to film 16 in Fig. 2. The resulting decalcomania can then be inserted in roll form into the tube envelope through the narrow tube neck and unrolled into position on the desired screen face. The remainder of the black and white screen fabrication process then becomes similar to the previously described color screen process, except for the fact that less care need be taken to reduce shrinkage and distortion of the transfer film. A black and white screen can tolerate more distortion and variation in phosphor depth than a color screen without serious impairment of ultimate utility.

The electron-permeable light-reflecting layer may be applied either during fabrication of the decalcomania or vaporized on a film covering the phosphors after the phosphors have been placed into position on the cathode-ray tube screen and the paper back removed. This film may then be baked out, as has been described.

Thus, it is seen that my process may be used to take advantage of transfer film 16 to provide a uniform surface upon which a smooth metallic screen backing may be placed. By using film 16 as both a transfer carrier and a forming surface for the metallic screen coating, I am able to take advantage of the highly accurate, known printing techniques considered totally unsuitable for applying phosphors directly to a transparent screen. My process avoids the inherent production complications of the directly-applied silk screen printing process without loss of phosphor placement accuracy and without loss of time inherent in the settling processes.

While there has been shown and described what is at present considered the preferred embodiment of the present invention, it will be obvious to those skilled in the art that various changes and modifications may be made therein without departing from the invention as defined by the appended claims.

I claim:

1. A method of manufacturing a luminescent screen assembly for a cathode-ray tube which comprises covering a transparent base with a transparent binding agent suitable for bonding phosphors thereto; covering the binding agent surface with the phosphor side of a decalcomania, having a phosphor-bearing transfer film and a removable backing layer; removing the backing layer;

coating the backing layer side of the transfer film with a light-reflecting electron-permeable metallic film and applying heat to substantially remove gases from the completed assembly.

2. A method of manufacturing a luminescent screen assembly for a cathode-ray tube which comprises covering the transparent screen base with a transparent binding agent suitable for bonding phosphors thereto; covering the binding agent surface before hardening with the phosphor side of a decalcomania having a phosphor-bearing transfer film and a removable backing layer; removing the backing layer; coating the backing layer side of the transfer film with a light-reflecting electron-permeable metallic film and applying heat to bind the phosphors to the transparent screen base and to substantially remove gases from the completed assembly.

3. A method of manufacturing a luminescent screen assembly for a cathode-ray tube which comprises applying luminescent phosphors in desired configuration to the surface of an organic transfer film having a backing layer removably bonded to form a decalcomania; covering a transparent screen base with a transparent bonding agent suitable for binding phosphors thereto; applying the phosphor side of the decalcomania to the bonding agent surface before the bonding agent completely hardens; removing the backing layer; coating the backing layer side of the organic transfer film with a light-reflecting electron-permeable metallic film and applying heat to bind the phosphors to the transparent screen base and to substantially remove gases from the completed assembly.

4. A method of manufacturing a luminescent screen assembly for a cathode-ray tube which comprises applying a layer of color phosphors in desired configuration to the surface of an organic transfer film having a backing layer removably bonded to form a decalcomania; covering a transparent screen base with a transparent bonding agent suitable for binding phosphors thereto when heated; applying the phosphor side of the decalcomania to the bonding agent surface; removing the backing layer; coating the backing layer side of the organic transfer film with a light-reflecting electron-permeable metallic film and applying heat to bind the phosphors to the transparent screen base and to substantially remove gases from the completed assembly.

5. A method of manufacturing a luminescent screen assembly for a cathode-ray tube which comprises applying color phosphors in desired configuration to the surface of an organic transfer film having a backing layer removably bonded to form a decalcomania; adhering the phosphor side of the decalcomania to a transparent screen base; removing the backing layer; coating the backing layer side of the organic transfer film with a light-reflecting electron-permeable metallic film and applying heat to bind the phosphors to the transparent screen base and to substantially remove gases from the completed assembly.

References Cited in the file of this patent

UNITED STATES PATENTS

| | | |
|---|---|---|
| 2,485,607 | Kasperowicz | Oct. 25, 1949 |
| 2,665,220 | De Gier | Jan. 5, 1954 |
| 2,681,293 | Bayford et al. | June 15, 1954 |